I. ADAMS.
Machine for Trimming and Finishing Boot and Shoe Soles.
No. 209,787. Patented Nov. 12, 1878.
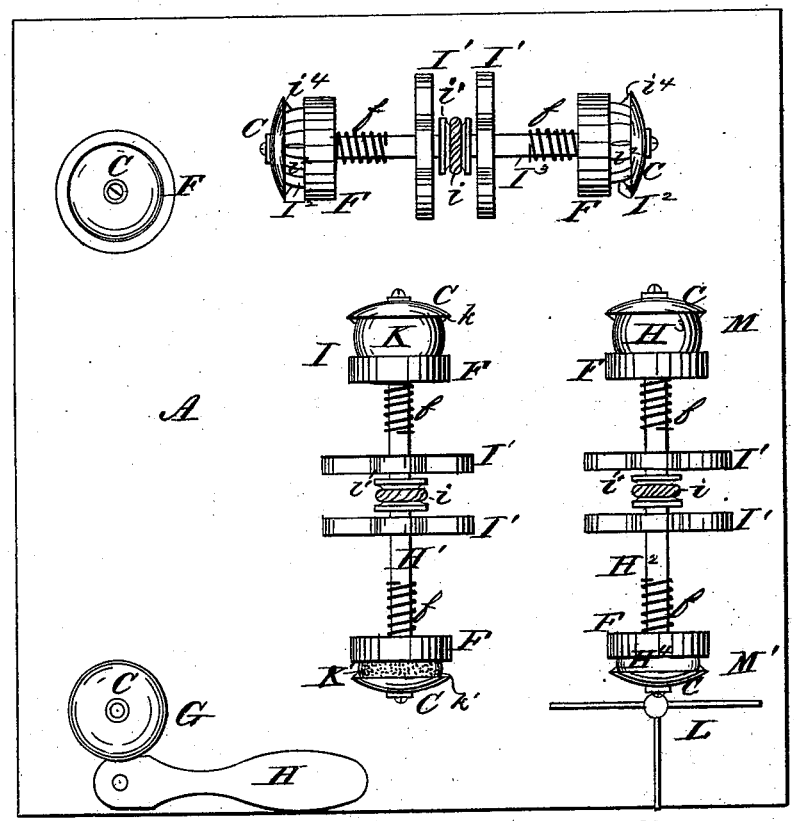
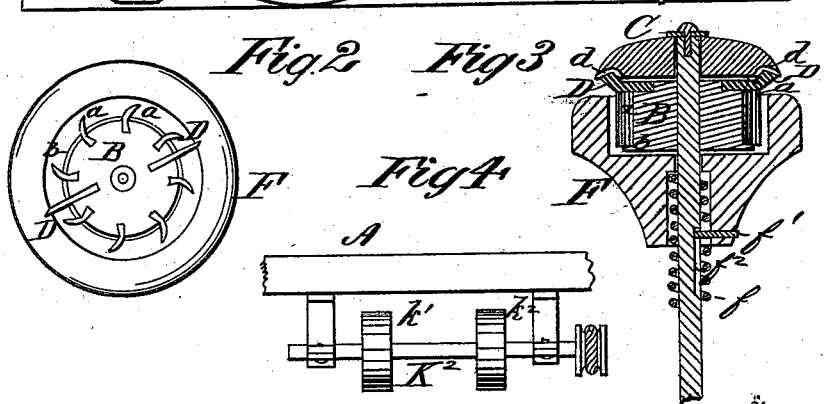

UNITED STATES PATENT OFFICE.

ISRAEL ADAMS, OF WORCESTER, MASSACHUSETTS.

IMPROVEMENT IN MACHINES FOR TRIMMING AND FINISHING BOOT AND SHOE SOLES.

Specification forming part of Letters Patent No. 209,787, dated November 12, 1878; application filed August 16, 1878.

*To all whom it may concern:*

Be it known that I, ISRAEL ADAMS, of Worcester, in the county of Worcester and State of Massachusetts, have invented certain new and useful Improvements in Machines for Trimming and Finishing Boot and Shoe Soles and Heels; and I do hereby declare the following to be a full, clear, and exact description of the invention, such as will enable others skilled in the art to which it pertains to make and use it, reference being had to the accompanying drawings, which form part of this specification, in which—

Figure 1 is a plan view of my improved machine. Fig. 2 is a plan view of trimming-tool, the upper guard being removed. Fig. 3 is a vertical central section of the trimming-tool. Fig. 4 is a detail view, showing the buffers for bottoms of soles and heels.

My invention has relation to machines for trimming soles and heels of boots and shoes, and has for its object chiefly the provision of means for protecting the upper from damage during the operation of the rotary cutting or finishing tool.

My invention accordingly consists in the combination, with a rotary edge and rand trimming or finishing tool, of a grooved guard-plate, to protect the upper, said tool being arranged and adapted to rotate independently of the guard-plate.

In order to give a clear idea of my invention and its application, I will describe the construction and arrangement of an organized machine embodying my improvement as applied to the several tools used in trimming and finishing soles and heels, it being understood that I do not limit my use of the grooved guard-plate to mere cutting-tools, but regard its use in connection with other tools used in finishing the soles and heels as equivalent to its use in connection with the trimmer.

In the accompanying drawing, A designates the main frame or table of the machine, above the surface of which the working parts are situated, the power being applied below or in any suitable manner.

Referring now to the trimming-tool, B designates a cylindrical cutter, or a cylinder with many knives projecting from its periphery or hub, which is formed with radial dovetailed grooves to receive the correspondingly-shaped shanks of the knives *a*.

When in place the knives rest upon a flange, *b*, of the hub, and are embraced and held between the same and the under surface of the guard C, surmounting the cutter.

The projecting portions of the knives are, preferably, to be made with one or both sides concave, by which better cutting quality is obtained.

The method of attachment to the hub renders the knives separately detachable for any desired purpose.

The cutting-edges of the knives may be either straight, curved, or irregular from end to end, and adapted to the shape of the sole intended to be formed.

D D designate cutters for trimming or beveling the upper edge of the sole. These cutters are secured to the upper part of the hub, their shanks being embedded in suitable recesses, while their cutting portions project upwardly at an angle corresponding to the required bevel of the sole-edge.

If there were no means to prevent, the bevel-cutters would, in action, cut the upper with their points and destroy the shoe. I therefore provide the guard C, which consists of a convex plate or disk, which rests upon or is located above the cutter, to the shaft of which it is attached by a screw or other detachable means of fastening, which will permit of the disk being removed, and of the employment of different sizes of guard corresponding to different kinds and sizes of shoes.

In the under side of said guard-disk is formed an annular groove, *d*, into which project the points of the beveling-knives. The edge of the disk during the operation of trimming lies between the sole and upper, protecting the latter from cutting, abrasion, or other injury—for instance, burning, which often results from the heat generated in the knives and hub by the action of the tool. The parings taken off by the beveling-knives pass through the groove on the guard, which prevents choking. The guard is loose upon the shaft, and hence is intended to remain stationary, or nearly so, while the tool is rotating, so as to not become heated or wear the upper.

F designates a yielding collar or roller, resting upon a spring, $f$, attached to the shaft of the cutter, and recessed internally, so as to embrace the lower part of the cutter.

In the operation of trimming the sole of the boot or shoe, it is placed upon the collar F, and between the same and the guard, the collar adjusting itself upon its spring to the thickness of the sole, and the latter being guided by the hand upon and against the revolving knives of the cutter. While the knives of the cutter are cutting and trimming the sole into proper shape, the bevel or rand cutters cut the upper edge of the sole, the upper of the shoe resting upon and against the guard.

For trimming and shaping the heel a separate cutter may be employed, as shown at G; and in connection therewith a support, H, is used, of the ordinary construction, to hold the shoe and allow it to be moved according to the requirements of the proposed shape of heel. The heel cutting and trimming tool is similar in general features to the sole cutting and trimming tool.

After trimming the sole and heel the next operation is the application of the glue, and for such operation the tool I is employed. This tool is very similar in many respects to the cutting and trimming tool, having, like the latter, the grooved guard, the yielding spring roller or collar, and the rotating cylinder; but the latter is unprovided with cutters. The glue is fed upon the cylinder from a glue-pot directly under it. The gluing-cylinder is to be covered with cloth, leather, or other substance which will take up the glue.

While the trimming-tool is upon a vertical shaft, by preference, the gluing-tool is arranged upon a horizontal shaft, as are also the several tools for the succeeding operations.

The horizontal shaft or shafts are supported upon standards $I^1$, midway between their ends, each shaft end having a complete tool of like or respectively different sizes.

Power is applied to the several shafts by means of belts and pulleys $i$ $i^1$, respectively, deriving motion from a common source or main shaft.

$K^1$ designates the stoning-cylinder, on the opposite end of the shaft $H'$ from the gluing-cylinder K. The stoning-tool is very similar to the gluing-tool, but is made of stone of suitable grinding properties. The glue is to be applied to the beveled edge of the sole, and the rand-grinding effected by oblique studs $k$ $k^1$, corresponding in position with the bevel-knives of the trimming-tool.

$H^2$ is the shaft holding tools for operations next succeeding gluing and stoning. These operations are inking and black-balling. The tools M $M^1$ are substantially the same in form as the gluing-tool, and are both upon the one shaft. The inking and balling cylinders may be covered with cloth, leather, or other equivalent material. $H^3$ represents the inking-cylinder, and $H^4$ the balling-cylinder, $H^5$ being the shaft.

$I^2 I^2$ designate the cylinders, and $I^3$ the shaft, of the burnishing-tools. These cylinders have convex ribs $i^2$ and oblique studs $i^4$.

$K^2$ designates a horizontal rotary shaft, holding cylinders $k^1$ $k^2$, one covered with fine and the other with coarse sand-paper or its equivalent, for buffing the bottoms of the soles and heels.

L designates a rotary fan, for drying the glue and ink.

The various cylinders for trimming, gluing, stoning, inking, balling, and burnishing are readily removable from their shafts, so that different sizes and shapes may be used. Sets of the respective cylinders should be provided, some being intended for the soles and others for the heels, the sole and heel cylinders being interchangeable on their shafts.

The collars F, it will be observed, are provided with studs $f^1$, entering longitudinal grooves $f^2$ in the tool-shafts, whereby, while said collars are allowed to yield or adjust themselves lengthwise of the shaft, they are yet caused to turn with said shafts, and are prevented from wabbling or other irregular motion.

Having now fully described my invention, I claim as new and desire to secure by Letters Patent—

The combination, with a rotary edge and rand trimming or finishing tool, of a grooved guard-plate to protect the upper, said tool being arranged and adapted to rotate independently of the guard-plate, substantially as described.

In testimony that I claim the foregoing I have hereunto set my hand this 16th day of August, 1878.

ISRAEL ADAMS.

Witnesses:
  CHAS. HADAWAY,
  JOS. B. CONNOLLY.